Jan. 28, 1964  R. E. STILWELL ETAL  3,119,403
SEQUENTIAL IRRIGATION VALVE
Filed Feb. 10, 1961  2 Sheets-Sheet 1
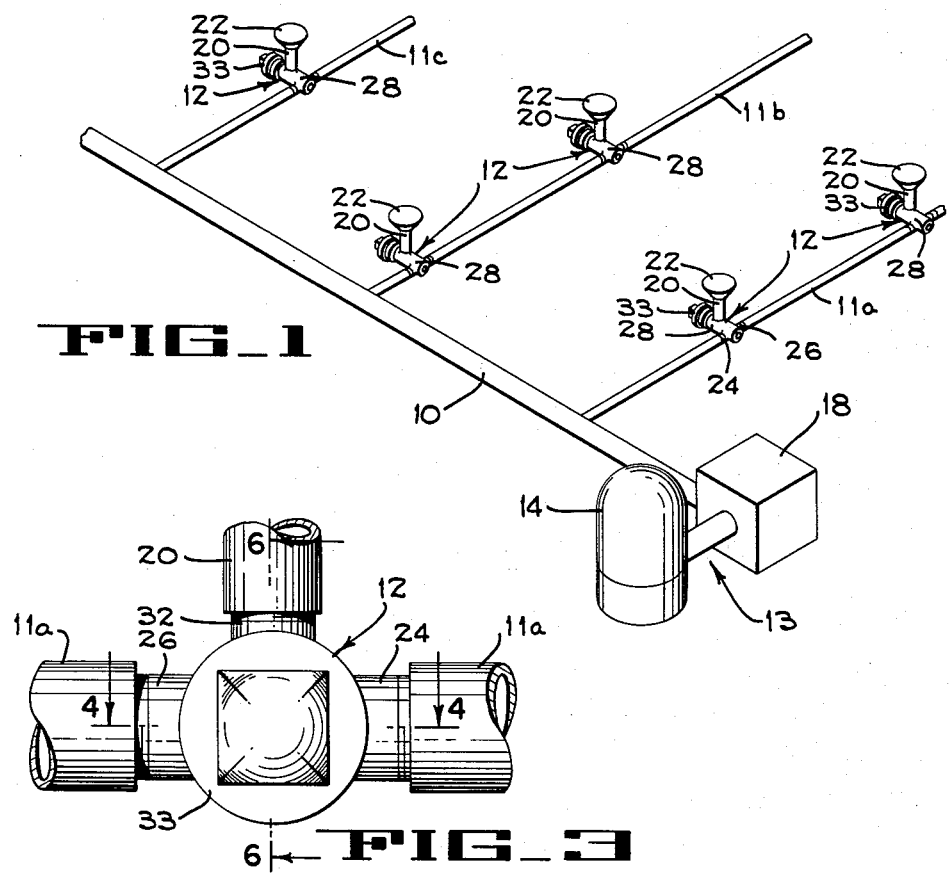
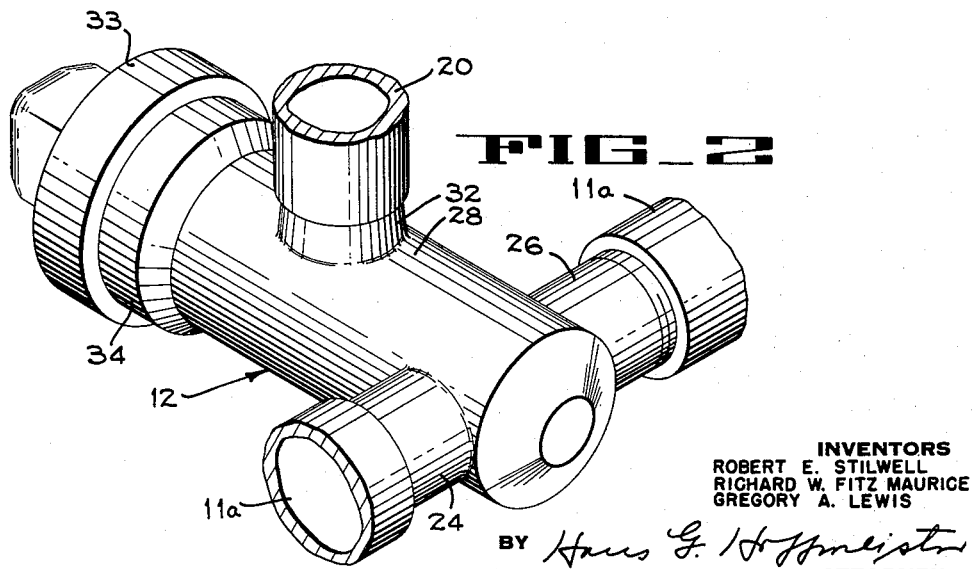
INVENTORS
ROBERT E. STILWELL
RICHARD W. FITZ MAURICE
GREGORY A. LEWIS
BY
ATTORNEY Jan. 28, 1964    R. E. STILWELL ETAL    3,119,403
SEQUENTIAL IRRIGATION VALVE
Filed Feb. 10, 1961    2 Sheets-Sheet 2
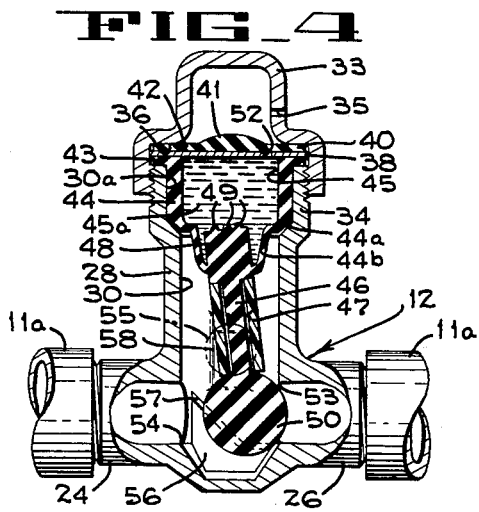
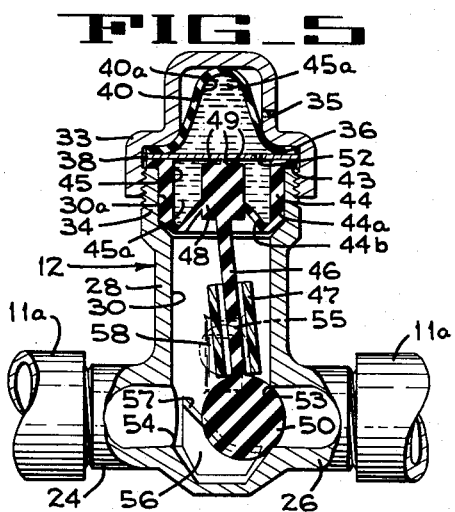
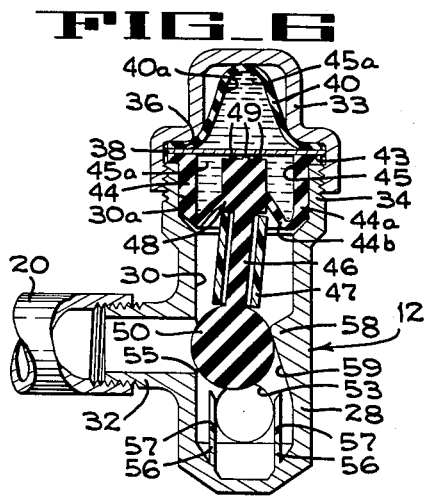
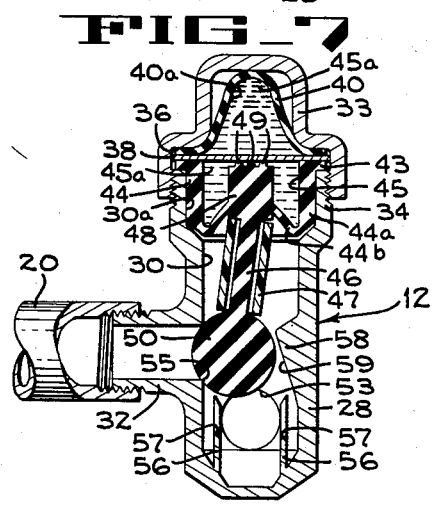
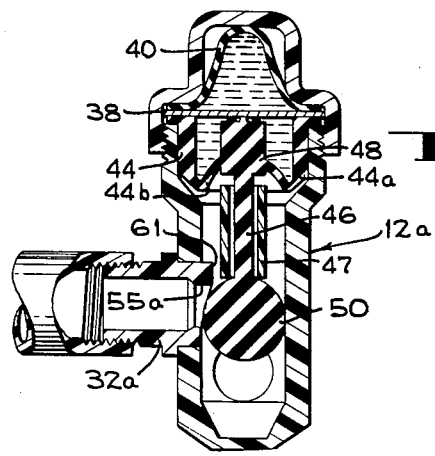
INVENTORS
ROBERT E. STILWELL
RICHARD W. FITZ MAURICE
GREGORY A. LEWIS
BY
ATTORNEY

United States Patent Office 3,119,403
Patented Jan. 28, 1964

3,119,403
SEQUENTIAL IRRIGATION VALVE
Robert E. Stilwell and Richard W. Fitz Maurice, Santa Clara, and Gregory A. Lewis, San Jose, Calif., assignors to FMC Corporation, a corporation of Delaware
Filed Feb. 10, 1961, Ser. No. 88,522
5 Claims. (Cl. 137—119)

The present invention relates to irrigation system of the sequential type, and more particularly to the discharge valves used in such irrigation systems.

Systems of the type to which this invention relates include a water supply conduit into which is connected a row of sequencing valves which valves mount sprinkler heads, and the sprinkler heads are successively activated, one by one, by the sequencing valves. There may be two or more of such valved conduits each connected to a supply line or pressure source.

The operation of the sequencing valves in one conduit will be described briefly. When water under pressure is first introduced into the system, the first valve, which is the valve nearest the pressure source, will close off the section of the conduit on the down-stream side of the valve and the sprinkler port of the first valve will be open. A control station connected to the supply line is provided for periodically causing pressure in the valved conduit to be temporarily reduced to cause valve transfer action, and then restored to normal operating pressure to initiate sprinkling from the next valve in the series.

After conduit pressure has been temporarily reduced and then restored for the first time, the sprinkler port of the first valve in the conduit will have been automatically closed off and a conduit outlet in said first valve will be open, to connect the pressure source to the second valve, which now assumes its sprinkling function. As pressure is cyclically varied at the control station, this mode of operation continues sequentially along the conduit, until each valve has been individually operated to first sprinkle the surrounding area, followed by a closing of the sprinkler port and opening of the source to the next succeeding valve. In normal operation, once a valve closes off its sprinkler port, that port remains closed during successive sprinkling cycles occurring at valves mounted down the line.

A valve for use in such a system is described in detail in the copending application of Stilwell et al., Serial No. 766,912, filed October 13, 1958, now Patent Number 3,080,881, and assigned to the assignee of this application, and over which the valve of this invention is an improvement. The sequence valve of the type to which this invention relates includes a valve member in the form of a rubber ball that first closes the conduit outlet port leaving the sprinkler port open, and then closes the sprinkler port leaving the conduit port open, under remote pressure control. Valve actuating means are provided that freely suspend the ball in the valve chamber and the ball moves transversely to the direction of flow through the conduit inlet and outlet ports, as the ball member is shifted from the conduit outlet port to the sprinkler port. This construction provides a free, non-binding action as well as a self-cleaning action. This construction also has an advantage in that there are no sliding parts in the chamber exposed to the irrigation water that can become clogged or jammed, and the parts are simple, light, and economical to construct. Finally, the pressure drop across each valve is small—an important factor where a large member of valves are placed in series in a line.

It is an object of this invention to obtain the advantages of a freely mounted, transversely shifted valve member, while insuring reliable operation, as well as reducing to a minimum loss of water that occurs during closing of the valve. As will presently be explained, prevention of water loss during closing of the valve is particularly desirable.

Briefly, in accordance with the invention, water loss or "dribble" that might otherwise occur during operation of a valve of the type described, is reduced to a minimum by providing valve ball guiding means in the valve housing that mechanically position the ball valve close to, but not quite against, one or both valve ports. Thus, when water pressure is restored, the valve ball is in a position to instantly close the associated port, with a minimum of water loss or "dribble."

Another object of the invention is to provide a valve which is reliable in operation despite the cumulative effects of pressure drops that inevitably occur at each valve when a large number of valves are placed in series in a single conduit.

Other objects and advantages of the present invention will become apparent from the following description and the accompanying drawings, in which:

FIG. 1 is a diagrammatic perspective of a portion of a sequential irrigation system whose discharge valves embody the invention.

FIG. 2 is an enlarged perspective of one of the valve assemblies of the invention, portions of the pipe line being shown and the sprinkler head connection being broken away.

FIG. 3 is a side elevation drawn to a reduced scale, of the valve cap side of the valve of FIG. 2.

FIG. 4 is a horizontal medial section taken on lines 4—4 of FIG. 3, illustrating the idle or inactive position of the valve member.

FIG. 5 is a view similar to FIG. 4, illustrating a first operational position of the valve member, wherein the downstream conduit section is closed off and the sprinkler port is open.

FIG. 6 is a vertical section taken along the lines 6—6 of FIG. 3, showing an intermediate operational position of the valve member wherein the valve ball has shifted to, but has not closed off, the sprinkler port.

FIG. 7 is a view similar to FIG. 6 but showing the sprinkler port closed off.

FIG. 8 is a section similar to FIG. 7 but showing a modified form of the valve wherein the sprinkler port has an internal projection forming an inclined seat for the valve.

Reference has been made to the problem of water loss, and this problem and its solution will be explained fully before structural details of the invention are described. Referring to a valve that is about to receive water under pressure for the first time, the valve ball will normally be positioned in front of the conduit outlet port ready to close the port on initial application of pressure to the valve and the valve ball shifts to a position in front of and ready to close the sprinkler port on subsequent temporary reduction in conduit pressure. Finally the valve ball responds to the restoration of conduit pressure to effect the final closing of the sprinkler port. Since the ball valves are virtually pressure-balanced in the valve chamber and since they are not spring closed, but rather are closed in response to an increase in conduit pressure, a considerable quantity of water flows initially around the valve balls of all valves during the time required for their closing movement. Such flow delays pressure build up in the system.

This invention reduces to a minimum the amount of fluid that flows around or leaks past the valve balls during the pressure increase portion of the cycle, which increase causes the seating of the various valve balls. Usually some of the valve balls will be positioned in front of their sprinkler ports and the remainder will be positioned at conduit ports. Assume, for example, that in a given line there is a group consisting of three fourths of the valves that have previously been disposed (one by one) in their sprinkling condition, so that now the valve balls are disposed at their sprinkler ports. Assume further that conduit pressure has been temporarily reduced and is now being restored, in order to close the sprinkler ports of the aforesaid group of valves. This means that the sprinkler ports of the entire group of valves must be fully closed before full line pressure can be restored. On the other hand, there is but one conduit port that must be closed, namely, the conduit port in the one valve that immediately follows the group, which valve is to now receive water under pressure for the first time. As the pressure surge travels down the conduit and through the conduit ports of the aforesaid group of valves, leakages that occur past the valve balls at the sprinkler ports of the respective valves in this group will sequentially delay the surge and intended pressure build up, the delay and total leakage being proportional to the number of valves in the group.

It can be seen that the effects of leakage or "dribble" at the sprinkler port of a given valve in the group will be multiplied by the number of valves in the group, and for this reason the reduction in such leakage at the sprinkler ports can be considered to be of more importance than the reduction in leakage at the conduit ports, because at any one time only one conduit port must be closed. In fact, excess leakage at the sprinkler ports could severely limit the number of valves that can be placed in a given conduit. On the other hand, leakage at the conduit port could be a problem in the case of a valve near the end of a long line of valves, where flow friction due to the pressure drop that inevitably occurs across a large number of valves, reduces the velocity and pressure of the water. In accordance with this invention leakage at the sprinkler ports can either be eliminated or rendered in consequential, and if so desired, any leakage that might occur at the conduit ports can also be reduced.

As will be described in detail in the portion of the specification that follows, this is accomplished by guiding the ball at the sprinkler outlet port, to bring the ball close to the port. The ball does not firmly or hydraulically seal the port. The ball is in a position close to the sprinkler port, ready to close the port upon restoration of conduit pressure, and yet the ball is free at all times to assume whatever position represents the proper and normal operation of the device. There may be valve ball guiding structure of this nature at both the conduit outlet port and at the sprinkler outlet port, or such structure may be placed at only one of these ports. In either case, waste and dribble during remote control pressure operation are reduced, so that the number of valve assemblies that can be connected in series in a line or conduit is not limited.

The construction of valves embodying the invention will now be described in detail. Referring to FIG. 1, a sequential irrigation system is shown in part. The system comprises a main pipe line 10, and a plurality of spaced, parallel lateral pipe lines or conduits 11a, 11b, 11c, etc. Located along each of the conduits is a spaced combined sprinkler head support and valve members 12. Supply of water to the system is controlled by an automatic timing mechanism 13 which, according to the diagrammatic showing in FIG. 1, includes a pump 14 of conventional design and an automatically timed valve 18. The valve 18, which likewise is of conventional design, periodically effects a temporary reduction in the pressure of the water within the system.

A riser pipe 20 is connected to each of the members 12, and each riser pipe 20 is adapted to carry at its upper end a sprinkler head 22. The sprinkler heads 22 can be of any type. Inasmuch as the members 12 are all of like structure, a description of one will suffice for all.

Referring to FIGS. 2 and 3, the member 12 illustrated therein comprises a hollow, T-shaped housing having a cross-bar portion formed of an inlet conduit nipple 24 and an outlet conduit nipple 26, which nipples adapt said member for connection into a pipe line, such as the lateral conduit 11a. The riser pipe 20, which bears a sprinkler head 22 (FIG. 1), is connected to the stem portion 28 of the housing. As seen in FIG. 4, the stem portion provides a valve chamber 30 in communication with the inlet and outlet conduit nipples 24 and 26. A sprinkler outlet nipple 32 (FIGS. 2, 6 and 7), which threadedly receives the sprinkler riser pipe 20, likewise communicates with the valve chamber 30.

Referring to FIG. 4, the chamber 30 is closed by means of a cap 33 which is screwed onto the end 34 of the stem portion 28. The cap 33 is provided with an air breather passage 35 and is formed with an internal annular shoulder 36 which cooperates with the annular end face of the stem portion 28 to mount a rigid circular plate 38, a rubber diaphragm 40, and an annular flange 43. The flange 43 serves to mount a flexible cup 44 in the diameter 30. The cup 44 and plate 38 cooperate to form a liquid reservoir or lower diameter 45. As seen in FIGS. 5–7 the diaphragm 40 will stretch to form with the plate 38 an upper liquid chamber 40a, whereas the diaphragm is shown collapsed in FIG. 4. The diaphragm 40 is of construction at its central area 41, as compared to its peripheral area 42.

The flexible cup 44 is of resilient material such as rubber and has a cylindrical outer wall portion 44a which fits snugly in a counterbore 30a formed in the valve housing. The cup 44 is formed with a thin walled inner diaphragm portion 44b. The chamber 45 contains a non-compressible, viscous fluid 45a, such as a silicone base liquid.

Extending into the chamber 30 from the diaphragm portion 44b is a valve stem 46 of flexible, resilient material, and about which is disposed a cylindrical sleeve 47 constructed of semi-rigid, corrosion-resistant material, such as nylon. The sleeve 47 is split longitudinally along one side to facilitate its installation upon the stem 46. There is a projection 48 that extends from the end of the stem a short distance into the chamber 45. The outer end of the projection 48 is formed with a plurality of protuberances 49 that prevent the creation of suction between the projection 48 and the plate 38.

At the inner end of the stem 46 is a ball valve 50 and the cup 44, stem 46 and ball valve 50 are preferably molded as a single piece of rubber or the like.

The plate 38 is provided with a restricted orifice 52 located intermediate the center and the circumferential edge thereof.

The valve housing is formed with a conduit outlet port or valve seat 53 at the inner end of the conduit nipple 26, with a conduit inlet port 54 at the inner end of the conduit nipple 24, and with a sprinkler port or valve seat 55 at the inner end of the sprinkler nipple 32. As a consequence of the flexible nature of the cup 44 and the stem 46, the valve ball 50 can readily be shifted slightly from its idle or inactive position (shown in FIG. 4) wherein the ball is positioned in front of, but not closing the conduit outlet port 53, to a position (shown in FIG. 5) in which the valve 50 seats against and closes the conduit outlet port 53. The valve ball can also assume a position (shown in FIG. 6) wherein the ball is in front of, but not closing the sprinkler port 55, from which it can be shifted slightly to a position (shown in FIG. 7) in which it closes the sprinkler outlet port 55.

As previously mentioned, means are provided in accordance with this invention to reduce the amount of "dribble" or leak of fluid when conduit pressure is restored or brought back to normal after a temporary reduction in pressure, to seat the valve. Referring to FIGS. 4–7, a pair of laterally spaced ramps or webs 56 are cast into the valve body opposite the port 53 for the outlet conduit and having inclined ramp or guiding surfaces 57. When the valve ball 50 is in its idle or inactive position as seen in FIG. 4 (that is, before pressure has been introduced to the conduit and before the valve actuating mechanism has been activated or "cocked") ramp or guiding surfaces 57 of the webs 56 position the ball valve close to but not in actual fluid sealing engagement with, the conduit outlet port 53.

As seen in FIG. 6, in the valve under description, a single ramp 58 having an inclined ramp or guiding surface 59 is located opposite the sprinkler outlet port 55. Face 59 is inclined toward the conduit outlet port 55. The ramp 58 brings the valve ball 50 close to, but not in active fluid sealing engagement with, the sprinkler outlet port 55, when the ball is positioned at that port and when conduit pressure has been reduced.

The operation of the device of FIGS. 4–7 will now be described in more detail. Referring to FIG. 4, the valve is shown in its inactive or idle position, which is the position it occupies up to the time that the water under pressure first reaches the valve. Under this condition, the fluid in the diaphragm assembly will have been transferred from the upper chamber 40a to the lower chamber 45 by the resilient action of diaphragm 40. The valve ball 50 is held close to the conduit outlet port 53 by the webs or ramps 56, as can be seen in FIG. 4, but the ball is not hydraulically seated on the port. In a typical design, with a valve ball of 1³⁄₁₆ inches diameter, the gap between the ball and the port is of the order of ¹⁄₃₂–¹⁄₁₆ of an inch.

Assume that the first time water under pressure enters the inlet nipple 24 of the valve. The first thing that occurs is that the gap between the ball valve 50 and the valve port or seat 53 is closed due to the impact and velocity effects of the fluid as it impinges upon the valve ball. Any small amount of water that may flow past the valve ball before it seats, washes the port or seat 53 clean, assuring a good seal. As soon as the valve ball reaches the seat 53 it is held there by fluid pressure; however, fluid can flow out the sprinkler port 55. Since only one sprinkler in a line will be sprinkling, and since the sprinkler head 22 forms a relatively restricted orifice, pressure will soon build up in the valve housing and keep the conduit port closed.

As seen in FIG. 5, as conduit pressure builds up during the sprinkling phase of operation, in addition to maintaining the valve ball seated, the valve actuating mechanism is cocked. Water pressure acting on the underside of the diaphragm 44b urges the diaphragm toward the plate 38. As the diaphragm moves toward the plate, fluid 45a is transferred from the lower chamber 45, through orifice 52, into the upper chamber 40a. This stretches the rubber stem and pulls on the ball valve, but the ball valve remains seated against the conduit outlet port 53, because of the mechanical interlock between the ball and the surrounding port 53. The result is that the cocking or actuating action merely stretches resilient valve stem 46, although such stretching does apply a shifting force to the ball that is transverse to the line of fluid flow from the conduit inlet to the conduit outlet port, and transverse to the line of application of sealing pressure.

Now, with the actuating mechanism cocked, when conduit pressure is again reduced at the valve (as by action of timer mechanism 13) there is nothing to prevent the ball valve from being pulled away from the conduit outlet port 53 to a position in line with the sprinkler port 55. As the ball is moved toward the sprinkler port it is partially confined by the cam or ramp surface 59 on the ramp or web 58, which shifts the ball laterally, that is, to the left in the drawings. When it comes to rest, the valve ball is close to the sprinkler port 55, but a hydraulic seal with the sprinkler port is not formed. This is the condition illustrated in FIG. 6. However, the valve ball seats almost instantly when conduit pressure is restored, and this stage in the action of the valve is illustrated in FIG. 7.

After the condition of FIG. 7 is attained, there will be subsequent temporary reductions in conduit pressure, whereupon the valve balls 50 in the downstream members 12 in the line or conduit 11a will successively be moved into positions corresponding to that shown in FIG. 7. However, once the valve balls have assumed the position of FIG. 7, such subsequent temporary reductions in pressure will not restore the valve balls to the conduit port position shown in FIG. 5. This is because such subsequent reductions in pressure are maintained for periods of time that are too short for any substantial quantity of the liquid 45a in the upper chamber 40a to bleed back through the restricted orifice 52 and into lower chamber 45.

When all of the sprinkler heads 22 in the several lateral lines 11a, 11b, 11c, etc., have been operated, and all of the valve balls 50 have been moved into sprinkler port positions corresponding to that shown in FIG. 7, as above described, the water supply should be turned off completely. The fluid 45a distending the diaphragm 40 of each member 12 will then slowly be returned through the respective orifices 52 to the respective lower chambers 45. As a result, the diaphragm 40, cup 44, stem 46 and valve ball 50 of each valve 12 will resume the inactive position with the valve ball in front of but spaced slightly from the conduit port as shown in FIG. 4.

When all of the valves 12 have resumed their inactive positions as above-described, the system is in readiness for a subsequent cycle of operation. The timing mechanism 13 can be so designed to automatically initiate the subsequent cycle of operation at any desired time after all of the valves 12 have thus been placed in readiness.

It will be noted that during transfer, the motion of the valve ball is transverse to the line of fluid flow between the conduit ports and out of the sprinkler port so that any dirt or foreign material accumulated at the valve seats is wiped away and is not packed against the valve seats, as it would be if the transfer or shifting motion if the valve ball were in the direction of fluid flow. More important, however, is the fact that although the valve ball is perfectly free to move between its two operative positions, it is guided by the webs or ramps 56 and 58, respectively, and the ball comes to rest close to either of the associated valve seats, so that there is very little "dribble" or water loss where water pressure is resumed and the ball is pressed onto the seat.

In the modified form of the invention shown in FIG. 8, the construction for closing off the sprinkler nipple port is somewhat different from that of the first form. In this form the valve body 12a has a sprinkler nipple 32a which has a projection 61 extending into the interior of the valve body housing. The inwardly facing surface of this projection is inclined, or beveled, to produce an inclined sprinkler outlet port or seat 55a facing away from the valve actuating mechanism. The body 12a and nipple 32a are separately formed of a rigid plastic material and the nipple is cemented or bonded in place in the body after the valve ball assembly has been installed in the body. As in the other forms, in the construction of FIG. 8, when the valve ball is positioned in front of seat 55a and when there is no pressure in the valve, there is a small clearance between the valve ball and the seat. The operation of the form of FIG. 8 is like that of the other forms. When the conduit pressure is reduced after cocking of the valve actuating mechanism has occurred, the valve ball is pulled by the stretched valve stem 46 until the valve ball 50 is positioned at the seat 55a forming the sprinkler outlet port. Because of the projection 61 in which is formed seat 55a, the valve ball is positioned by the opposite wall of body 12a so that it lies very close to but does not touch the seat 55a so that very little fluid will escape from the sprinkler port upon resumption of conduit pressure. The construction also leaves the valve ball 50 quite free for motion between its two positions in the valve chamber, as in the other modification. In some installations, it may be suitable to omit the lower, or conduit ramps 56, shown in FIGS. 4–7. As previously mentioned, conduit port ramps may be of importance only in valves near the end of a line. A construction without conduit ramps appears in the form of FIG. 8.

While particular embodiments of the present invention have been shown and described, it will be understood that the sequence valve of the invention is capable of modification and variation without departing from the principles of the invention and that the scope of the invention should be limited only to the scope and proper interpretation of the claims appended hereto.

The invention having thus been described, what is believed to be new and desired to be protected by Letters Patent is:

1. A fluid pressure operated sequence irrigation valve assembly comprising a housing, said housing having a conduit inlet port, a conduit outlet port, and a sprinkler outlet port spaced from said conduit outlet port in a direction transverse to the direction of fluid flow through said outlet ports, a valve movable in said housing in a direction transverse to that of fluid flow through said outlet ports for alternatively closing one of said outlet ports and opening the other outlet port under force of fluid pressure in the housing, fluid pressure responsive valve actuating means on said housing, means for resiliently connecting said valve actuating means to said valve to accommodate valve actuating motion of said valve actuating means from an inactive position to an active position while fluid under pressure in said housing maintains said valve in position to close said conduit outlet port, reduction of fluid pressure in said housing releasing said valve from its position at said conduit outlet port whereupon said resilient connecting means shifts said valve to close said sprinkler outlet port, said sprinkler outlet port being angularly inclined to the port axis to face said conduit outlet port and means in said housing opposite said sprinkler outlet port for mechanically holding said valve at said inclined sprinkler outlet port when fluid pressure in said housing is reduced.

2. A fluid pressure operated sequence irrigation valve assembly of the type that is connected in series in an irrigation conduit, said valve assembly comprising a housing having a conduit inlet port for connection to a pressure source, a conduit outlet port for connection to a downstream valve assembly and forming a valve seat, and a sprinkler outlet port forming a valve seat; a valve ball shiftable linearly in said housing between said outlet ports, said ball also being laterally displaceable in said housing for closing the outlet port at which it is positioned; pressure responsive valve actuating means on said housing, means for resiliently connecting said valve actuating means to said valve ball for linearly shifting said valve ball from one outlet port to a position in front of the other outlet port, said connecting means accommodating lateral displacement of said valve ball; and ramp means in said housing opposite to and facing at least one of said outlet ports, said ramp means also facing the other of said outlet ports for causing the linear shifting motion of said valve ball toward said one outlet port to impart limited lateral displacement of the ball toward said one outlet port, the spacing of said ramp means from said one outlet port being such that when said valve ball is finally positioned in front of the outlet port by said valve actuating means, a portion of the valve ball projects partially into the port, with the valve ball being very close to, but not engaging the valve seat formed by the port.

3. The irrigation valve of claim 2, wherein said ramp means is disposed opposite the conduit outlet port.

4. The irrigation valve of claim 2, wherein said ramp means is disposed opposite the sprinkler outlet port.

5. The irrigation valve of claim 2, wherein ramp means of the type defined are disposed opposite both of said outlet ports.

References Cited in the file of this patent
UNITED STATES PATENTS

| | | |
|---|---|---|
| 481,493 | Hopkinson | Aug. 23, 1892 |
| 1,253,013 | Doble | Jan. 8, 1918 |
| 1,593,125 | Jackley | July 20, 1926 |
| 2,638,308 | Kell | May 12, 1953 |